July 25, 1961   E. M. FISHER ET AL   2,993,806
METAL COATING OF PLASTICS
Filed Dec. 17, 1956

INVENTORS
*Earl M. Fisher*
*Edward G. Hamway*
BY
*Mc Coy, Greene & Grotenhuis*
ATTORNEYS

United States Patent Office 2,993,806
Patented July 25, 1961

2,993,806
METAL COATING OF PLASTICS
Earl M. Fisher and Edward G. Hamway, Toledo, Ohio, assignors to The General Tire & Rubber Company, Akron, Ohio, a corporation of Ohio
Filed Dec. 17, 1956, Ser. No. 628,615
4 Claims. (Cl. 117—71)

The present invention relates to the vacuum coating of flexible polyvinyl plastics and more particularly to the metal-coating of a plastic material, such as polyvinyl chloride or the like, which contains a monomeric plasticizer so as to be stretchable and flexible.

In order to obtain a durable polyvinyl material having the desired flexibility and extensibility at various temperatures, it is necessary to employ substantial amounts of liquid plasticizers or monomeric plasticizers which interfere with vacuum coating of the material. The migration or bleeding of the plasticizer to the surface being metal coated during the application of vacuum tends to prevent adherence of the condensed metallic particles to said surface and to render the metal film dull and splotchy so that the resulting article is unattractive. The vacuum coating of metal directly onto the surface of a sheet of flexible extensible plasticized polyvinyl material, such as polyvinyl chloride or the like, is therefore impractical.

Attractive metal-coated sheets can be prepared by vacuum coating a thin sheet of transparent plastic material, such as Mylar or polyvinyl chloride, which is free of objectionable plasticizers and cementing the metal-coated face to a sheet of polyvinyl material containing monomeric plasticizers, such as dioctyl phthalate, tricresyl phosphate, dioctyl adipate or the like. However, the resulting product will not have the desired softness and stretchability since the thin transparent covering sheet will not have these characteristics.

The preesnt invention provides a method of metal coating a plasticized polyvinyl compound without employing transparent layers which would interfere with flexing and stretching of the resulting article. According to this method the plasticized polyvinyl layer is coated to provide a thin hard impervious barrier layer of thermoplastic polyvinyl resins which may be vacuum coated with metal. Where polyvinyl resins form the barrier layer, the layer contains a major portion of a material which is not readily dissolved by the plasticizer of said polyvinyl layer so as to prevent bleeding of the plasticizer to the metal film during the vacuum-coating operation. The barrier layer, although not containing objectionable monomeric plasticizers, does not interfere with stretching and flexing of the article and permits the deposition of an attractive lustrous metallic film. If desired, a stretchable transparent plasticized film of polyvinyl chloride or the like may be applied over the metallized surface for protection. The above method produces attractive metal-coated articles and is well suited for the manufacture of flexible stretchable articles such as toys, belts, handbags, decorative sheets and the like.

Objects of the present invention are to provide a practical method for metal coating an article made from a plasticized polyvinyl compound, such as polyvinyl chloride or the like, and to provide a flexible stretchable article having a lustrous attractive metal finish.

Other objects, uses and advantages of the invention will become apparent to those skilled in the art from the following description and claims, and from the drawings in which:

Figure 1:
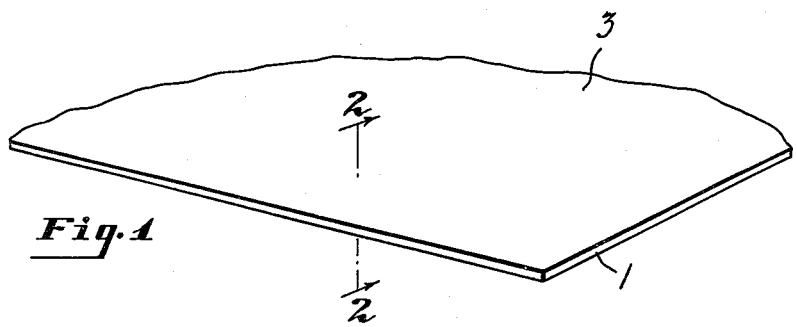
FIGURE 1 is a fragmentary perspective view showing a flexible stretchable polyvinyl chloride sheet that has been vacuum coated with aluminum according to the present invention.
Figure 2:
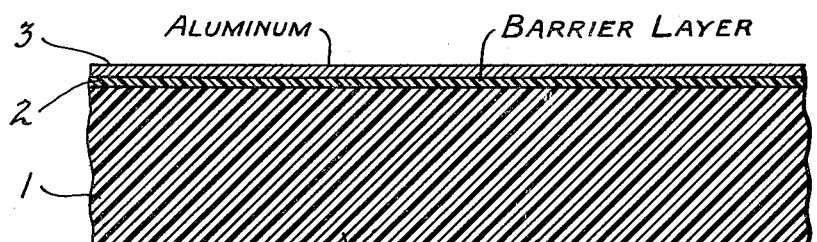
FIGURE 2 is a fragmentary vertical sectional view taken on the line 2—2 of FIG. 1 and on a larger scale.

Referring more particularly to the drawings, in which like parts are identified by the same numerals throughout the several views, FIGURES 1 and 2 show a flexible extensible sheet made according to the method of the present invention. The sheet consists of a relatively thick base layer 1, a relatively thin barrier layer 2 bonded to the base layer, and a relatively thin film 3 of a vacuum-deposited metal. As herein shown, the base layer is in the form of a substantially flat sheet of uniform thickness, but it will be understood that this layer may be of various shapes and sizes depending on the type of article being made and may, if desired, be reinforced with fabric.

The invention relates to the metal coating of flexible extensible plastic materials in the manufacture of toys, belts, handbags, decorative sheeting and the like. Such plastic materials are preferably long-chain thermoplastic vinyl resins which may be plasticized to obtain the desired amount of flexibility. The base layer preferably comprises thermoplastic vinyl resins and suitable compatible plasticizers, the major portion (and preferably at least about three-fourths) of the groups of said resins consisting only of carbon, hydrogen and halogen and being formed from monoolefinic compounds of the general Formula I,

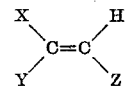

having one or two halogen groups, where C is carbon, H is hydrogen, X is a halogen having an atomic weight greater than 30 such as chlorine, and bromine (preferably chlorine), Y is selected from the group consisting of hydrogen and a halogen having an atomic weight greater than 30 (including chlorine, bromine and iodine) and preferably from the group consisting of hydrogen and chlorine, and Z is a member of the group consisting of hydrogen and said halogen.

Examples of such mono-olefinic compounds defined by said general Formula I are vinyl halide compounds such as vinyl chloride, vinylene chloride (1,2-dichloro-ethylene), vinylidene chloride, acetylene dibromide, vinyl bromide, vinylidene bromide, and the like. These monomeric materials, either alone or in admixture with one or more other compounds, may be polymerized in the solid or resinous state either en masse or by any of the various known emulsion polymerization techniques as desired.

The thermoplastic resins in the base layer 1 consist principally of polymers, including homopolymers and copolymers, of the above-mentioned mono-olefinic compounds and may consist entirely of such polymers or may include other resins in admixture with said polymers. Said polymers include copolymers and hydrolyzed copolymers of a major portion of the above-mentioned mono-olefinic compounds and a minor portion of copolymerizable mono-olefinic compounds (usually liquids) of the general Formula II,

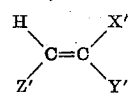

where X' is a member of the group consisting of hydrogen and alkyl groups (preferably methyl and ethyl groups), Y' is a member of the group consisting of nitrile, carboxyl, and esterified carboxyl groups (such as

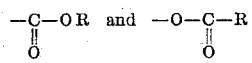

where R is an alkyl group such as methyl, ethyl, propyl, or the like), and Z' is a member of the group consisting of hydrogen, carboxyl, esterified carboxyl (as above), and halogen (including chlorine and bromine) groups. The hydrolyzed copolymers have a minor portion of hydroxyl groups (of the type found in polyvinyl alcohol) which can be reacted with aldehydes, such as formaldehyde, acetaldehyde, propionaldehyde, butyraldehyde, or the like, to form polyvinyl acetal groups.

Examples of the above-mentioned polymerizable mono-olefinic compounds are maleic and fumaric acids and similar alpha-beta olefinic-unsaturated carboxylic acids and their derivatives including esters of maleic and fumaric acids (particularly gem-diethers), such as dimethyl maleate, diethyl maleate, dimethyl fumarate, or diethyl fumarate; nitriles, esters and similar derivatives of acrylic acid including acrylonitrile, methyl acrylate, ethyl acrylate, n-propyl acrylate, isopropyl acrylate and other alkyl acrylates; acrylic acids; alpha-methyl acrylic acid, nitriles, esters and similar derivatives of alpha-methyl acrylic acid, including methyl acrylonitrile, methyl methacrylate, ethyl methacrylate, n-propyl methacrylate, isopropyl methacrylate and other alkyl methacrylates; vinyl and halogenated vinyl esters, such as vinyl acetate, vinyl butyrate, vinyl propionate, vinyl formate, chlorovinyl acetate, bromovinyl acetate and the like; and other unsaturated compounds having carbonyl groups including vinyl esters, vinyl ethers, vinyl ketones, and similar compounds.

The base layer 1 may, therefore, consist of suitable plasticizers and vinyl resins or resin mixtures. The vinyl resins may consist only of polymers (including homopolymers, tripolymers and other copolymers) of vinyl halide compounds or may consist of a mixture of such polymers with polymers (including anhydrides) of said copolymerizable mono-olefinic compounds included under the above general Formula II. However, the amount of cross linking should be minimized for flexible articles, and it is preferable to employ thermoplastic vinyl resins only.

At least about three-fourths of the depending groups, other than alkyl and hydrogen groups, attached to the long carbon chains of the thermoplastic resins (or resin mixtures) forming the base layer 1 are halogen groups (chlorine or bromine) derived from vinyl chloride, vinylidene chloride, acetylene dichloride, or other vinyl halide compounds of the above general Formula I,

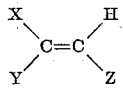

and up to one-fourth of said depending groups of said resins may be nitrile, oxygen-containing, or carbonyl-containing groups or other highly polar groups, such as a member of the group consisting of nitrile, carboxyl (including dehydrated carboxyl), esterified carboxyl, and hydroxyl (hydrolyzed carboxyl) groups derived from mono-olefinic compounds of the above general Formula II. The vinyl resins of the base layer 1 may, therefore, contain minor portions (preferably less than one-fourth) of highly polarized groups, such for example as

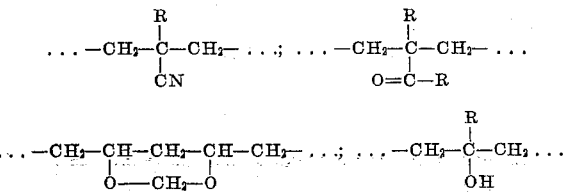

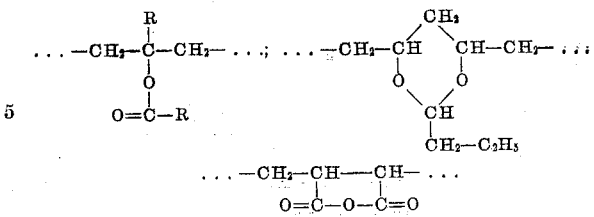

or the like, where R is a member of the group consisting of hydrogen and alkyl radicals, such as methyl, ethyl, n-propyl, isopropyl, n-butyl, or the like.

Excellent results may be obtained where 85 to 95 percent of the groups of the thermoplastic resins of the base layer 1 are formed from vinyl chloride and 5 to 15 percent of said groups are formed from vinyl acetate.

Other polymers of vinyl halide compounds well suited for the base layer 1 include other copolymers of vinyl chloride and vinyl acetate, polyvinyl chloride, copolymers of vinyl chloride and vinylidene chloride, polyvinylidene chloride, and polymers having vinyl acetal groups, such as polyvinyl butyral or the like.

It is to be understood that the term "polymer" as used in the specification and the appended claims, is used in the generic sense and includes copolymers (including tripolymers), homopolymers, or the like. The term "copolymer" is also used herein in the generic sense so as to include terpolymers and other polymers of at least two copolymerizable compounds.

Substantial amounts of plasticizer must be used to obtain highly flexible extensible thermoplastic articles of the type to which this invention appertains. It is preferable to employ a mixture of polymeric and monomeric plasticizers to obtain a high quality product. The monomeric plasticizers have a tendency to migrate so as to make metal coating by vacuum distillation difficult but are desirable because of their effectiveness at low temperatures. Polymeric plasticizers have less tendency to migrate but have caused difficulty when used by themselves at high vacuum and are not satisfactory for highly flexible substantially elastic articles since they are ineffective at low temperatures.

The polymeric plasticizers used in the base layer 1 may be rubbery copolymers of a conjugated diolefinic compound such as butadiene-1,3 and a carbonyl-containing mono-olefin, such as methylisopropenylketone; nitrile rubbers or copolymers of butadiene and vinyl cyanide (particularly copolymers of about 60 parts of butadiene-1,3 and about 40 parts of vinyl cyanide); or polyesters, such as polypropylene glycol adipate, polyethylene glycol adipate, polypropylene glycol sebacate, or other viscous condensation products of a polyethylene glycol and a polybasic acid having a molecular weight of around 1000 to 40,000.

The monomeric plasticizers used in the base layer 1 may be of various types suitable for polyvinyl halide resins or the like but are usually high boiling esters such as members of the group consisting of (a) organic phosphates, such as tricresyl phosphate, triphenyl phosphate, cresyl diphenyl phosphate, tributyl phosphate, trioctyl phosphate, or the like; (b) adipates, such as dioctyl adipate, dihexyl adipate, dibutyl adipate, diphenyl adipate, or the like; and (c) phthalates, such as dioctyl phthalate, diamyl phthalate, dibutyl phthalate, dicapryl phthalate, diethyl phthalate, dimethyl phthalate, diethoxyethyl phthalate, dibutoxyethyl phthalate, dimethoxyethyl phthalate, or the like.

The plasticizers present in the resins of the base layer 1 may consist entirely of monomeric plasticizers but usually consist of a mixture of one or more of the above-mentioned polymeric plasticizers and one or more monomeric plasticizers, such as dioctyl azelate, dioctyl phthalate, dioctyl adipate, tricresyl phosphate, or the like. The amount of plasticizers is sufficient to provide the desired amount of flexibility and extensibility and is usually at least 30 parts and not substantially more than about 100 parts by weight per 100 parts by weight of the resins. Small amounts of suitable stabilizers or the like may also be employed as will be apparent to those skilled in the art.

It is impractical to vacuum coat the base layer 1 directly with aluminum or other metal due to the tendency of monomeric or liquid plasticizers in the layer to migrate or bleed to the surface being coated. According to the present invention, such bleeding of the plasticizer is avoided by coating the base layer 1, prior to the vacuum coating, with a material which forms a hard non-volatile barrier film 2 substantially impervious to the plasticizers of the base layer 1.

The barrier layer 2 is preferably formed from long-chain thermoplastic polyvinyl resins which contain a large number of highly polar groups, such as nitrile, hydroxyl, carboxyl, esterified carboxyl, and other carbonyl-containing groups so as to resist migration of the monomeric and polymeric plasticizers of the base layer 1. The plastic employed in the barrier layer 2 is therefore relatively insoluble in and relatively impervious to the plasticizers of the base layer so that the partition coefficient of the barrier layer and base layer is low and migration of the plasticizer to the outer surface of the barrier layer during vacuum coating is greatly reduced. It is often preferable to employ minor amounts of resins derived from polyvinyl halide resins of the base layer 1 so as to obtain greater adhesion of the barrier layer to the base layer. The material used to form the barrier layer 2 is free or substantially free of monomeric plasticizers and is preferably free of polymeric plasticizers also. However, the vinyl resins employed in the layer may be of a more flexible substantially elastic type so that the barrier film does not interfere with flexing and stretching of the article.

The barrier layer 2 preferably consists of thermoplastic polyvinyl resins or mixtures thereof, the major portion (preferably at least two-thirds) of the groups forming said resins being derived from mono-olefinic compounds of the type described above with regard to the base layer 1 and defined by the above general Formula II,

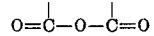

whereby a majority (preferably at least two-thirds) of the dependent groups other than hydrogen and alkyl, attached to the carbon atoms of the long carbon chains of said polyvinyl resins may be highly polar groups, such as nitrile, carboxyl, esterified carboxyl, and/or hydroxyl groups. The esterified carboxyl groups preferably have carbon atoms attached directly to carbon atoms of said long carbon chains. Examples of highly polar groups which may be present are indicated above with regard to the base layer and include groups found in polyvinyl anhydrides derived from maleic or fumaric acid. Resins containing esterified carboxyl groups may be hydrolyzed to form the hydroxyl groups. The hydroxyl groups formed by such hydrolysis are identified herein as "hydrolyzed carboxyl groups." The hydrolyzed copolymers may be condensed with aldehydes, such as formaldehyde, acetaldehyde, propionaldehyde, butyraldehyde, or the like to form cyclic vinyl acetal groups. The groups of the resins of the barrier layer may be formed from unsaturated dicarboxylic acids, such as acrylic, methacrylic, maleic, fumaric or similar acids, or esters thereof. The major portion (preferably at least two-thirds) of the groups of the polyvinyl resins forming the barrier layer 2 may be carbonyl-containing barrier groups or the like, such as ...—CH₂—CH—CH₂—...; ...—CH₂—CH—CH₂—...
          |                                    |
       O=C—O—CH₃                   O=C—O—C₂H₅

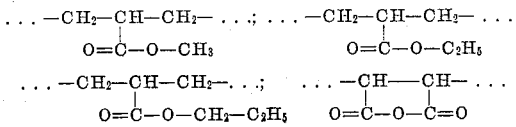

...—CH—CH₂—CH—...;   ...—CH—CH—...
       |          |                    |         |
       O——CH₂—O           H₃COOC  COOCH₃

CH₃                              CH₃
          |                                    |
...—CH₂—C—CH₂—...;   ...—CH₂—C—CH₂—...
          |                                    |
       O=C—OCH₃                    O=C—OC₂H₅

CH₃
          |
...—CH₂—C—CH₂—...;   ...—CH₂—CH—CH₂—...
          |                                    |
       COOH                             COOH or the like such barrier groups contain the highly polar oxycarboxide groups (OCO). The major portion of the depending groups, other than hydrogen and alkyl groups, attached to the carbon atoms of the long carbon chains of the polyvinyl resins forming the barrier layer 2 are preferably ester or esterified carboxyl groups, such as those formed from vinyl acetate methyl acrylate, ethyl acrylate, methyl methacrylate or ethyl methacrylate, or the like.

Anhydride groups may be considered as being dehydrated dicarboxyl groups. The term "dehydrated carboxyl groups" is used herein to describe groups such as

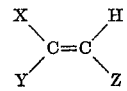

or the like.

A small portion of the barrier layer 2 may comprise one or more polyvinyl resins formed from mono-olefinic compounds having no more than two halogen groups and defined by the above general Formula I

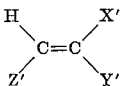

such as polyvinyl chloride, polyvinylidene chloride, copolymers of a major portion of vinyl chloride and a minor portion of vinyl acetate, copolymers of vinyl vinylidene chloride, or similar resins. A larger portion of the barrier layer may be formed from polyacrylonitriles and copolymers of acrylonitrile or methyl acrylonitrile with copolymerizable mono-olefinic compounds.

A major portion of and preferably at least about three-fourths of the groups of the polyvinyl resins or resin mixtures of the base layer 1 are formed from halogen-containing mono-olefinic compounds of the above general Formula I, and all or preferably at least about two-thirds of the groups of the polyvinyl resins of the barrier layer 2 are formed from mono-olefinic compounds of the above general Formula II. At least about three-fourths of the depending groups, other than hydrogen and alkyl groups, attached to the carbon atoms of the long carbon chains of the polyvinyl resins forming the base layer 1 are preferably halide groups, and at least about two-thirds of the dependent groups other than hydrogen and alkyl, attached to the carbon atoms of the long carbon chains of the polyvinyl resins forming the barrier layer 2 are preferably highly polarized barrier groups selected from the group consisting of nitrile, carboxyl, esterified carboxyl and hydroxyl groups so that the barrier layer is relatively insoluble in the monomeric plasticizer (or plasticizers) of the base layer 1 and prevents bleeding of the plasticizers through the barrier layer. Thus more than two-thirds of said dependent groups of the barrier layer 2 may be carboxyl or esterified carboxyl (ester) groups. A minor portion of the groups of the barrier layer 2 may be formed from halogen-containing compounds of the above general Formula I to improve adherence to the base layer. The dependent polar groups of the barrier layer 2 may, therefore, consist of a major portion of said highly polarized barrier groups and a minor portion of halogen groups.

Excellent metal-coated articles can be obtained by employing a base layer 1 consisting of 30 to 100 parts of monomeric plasticizers, such as tricresyl phosphate, dioctyl phthalate, dioctyl adipate, or the like and/or polymeric plasticizers, such as nitrile rubbers, polyesters or the like, and up to 20 parts of suitable heat and light stabilizers, such as fused lead stearate, basic lead carbonate, barium cadmium laurate or the like, per 100 parts by weight of thermoplastic polyvinyl resins. The base layer may contain an amount of fillers (such as calcium carbonate, carbon, etc.) and pigments up to about half the total amount of resins plus plasticizers.

It will be understood that the term "parts," wherever used in this application means parts by weight.

The laminated sheet may have a plasticized base layer 1 in which the resins consist of 80 to 90 parts by weight of a copolymer of 60 percent vinyl chloride and 40 percent vinylidene chloride and 10 to 20 parts by weight of polyvinyl acetate and may have a barrier layer 2 consisting of a copolymer of 5 to 10 percent vinyl acetate, 70 to 80 percent methyl methacrylate, and 10 to 20 percent vinyl chloride.

Satisfactory barrier layers may consist of copolymers of 70 to 85 percent ethyl methacrylate and 15 to 30 percent vinyl chloride or mixtures of 70 to 85 percent polymethyl methacrylate with 15 to 30 percent of polyvinyl chloride. The barrier layer may consist predominantly of a copolymer of a minor portion of vinyl chloride and a major portion of acrylic acid or an ester thereof which copolymer has been hydrolyzed to form polyvinyl alcohol groups. Such copolymer containing hydroxyl groups may be condensed with an aldehyde, such as butyraldehyde, to form cyclic acetal groups.

A mixture of three parts of a polyvinyl halide resin, such as polyvinyl chloride (homopolymer), with one part of polymethyl methacrylate or a coplymer of 3 parts of vinyl chloride and 1 part of methyl methacrylate cannot provide a satisfactory barrier layer 2 since the number of highly polar carbonyl-containining groups is too low to prevent migration of monomeric plasticizers, such as dioctyl phthalate, tricresyl phosphate, dioctyl adipate or the like. However, a mixture of 3 parts of polymethyl methacrylate and 1 part of vinyl chloride will prevent such migration.

The barrier layer 2 is preferably formed of thermoplastic polyvinyl resins which may be dissolved in a solvent such as methyl ethyl ketone or the like and applied by a doctor blade, by reverse roller coating, by brushing or by other suitable methods. After the barrier layer is applied, the sheet material is generally heated to evaporate any solvents remaining in the barrier layer and to set the material so that the barrier layer 2 is hard and impervious and suitable for vacuum coating.

Metal particles may be deposited by vacuum distillation in the conventional manner to form the thin metal film 3 on the outer surface of the barrier layer 2. The sheet metal to be coated is placed in a coating chamber which is evacuated to eliminate molecular interference between the source of the coating material and the surface of a barrier film 2 to be coated. Rotary high vacuum pumps or diffusion pumps may be used to evacuate the coating chamber. The metal or other coating material is heated intensely so that it vaporizes and travels from the source to the outer surface of the barrier layer 2, the high vacuum facilitating evaporation of the coating material. The absence of air in the coating chamber permits the vaporized metal or other coating material to travel directly to the outer surface of the barrier layer which is relatively cool, the vaporized metal condensing to form a bright continuous adherent film 3 on the outer surface of the barrier layer 2. The film 3 provides an attractive lustrous finish layer for the articles shown in FIGS. 1, 2 and 3.

The coating process may be a continuous or semicontinuous process in which the sheet material is unrolled and fed past the source of metal or other coating material in the evacuated coating chamber where it is coated and is thereafter rolled upon a take-up roll. Processes of metal coating sheet material by vapor deposition are well known in the art as disclosed, for example, in U.S. Patents No. 2,562,182; No. 2,622,041; No. 2,635,579; No. 2,643,201; No. 2,664,852; No. 2,664,853; No. 2,665,223 to No. 2,665,229, inclusive; and No. 2,665,320.

The terms "vacuum coating" and "vacuum-deposited" wherever employed herein are used in their broad sense to include the conventional cathode-sputtering process in which the metal to be coated is transferred to the barrier layer 2 by high voltage bombardment rather than by direct thermal evaporation. The equipment required is similar to evaporation unit except that an inert atmosphere and a more moderate vacuum may be employed in the coating chamber and a high voltage rather than a high amperage power supply is employed. However, the cathode-sputtering process is usually impractical except for precious metals, such as gold, silver or the like, due to its low rate of production.

The coating metal is usually aluminum but sometimes zinc, silver, gold or inorganic compounds are employed. The coating metals may be aluminum, silver, gold, copper, zinc, chromium, cobalt, nickel, selenium, and, in fact, practically any metal and any metallic compounds as well as alloys can be deposited by vacuum coating. Aluminum or an aluminum alloy is usually preferred due to its low cost, availability, resistance to tarnish, high reflectance and ease of evaporation. One pound of aluminum can cover as much as 25,000 square feet of surface. Zinc is also an excellent coating material since it is easier to deposit than is aluminum. The thickness of the film 3 is usually two or three millionths of an inch although such thickness may range from one millionth to fifty millionths of an inch. The term "atomic dimensions" is used in the specification and claims to describe the size of the extremely minute particles capable of forming such a thin film 3.

The barrier layer 2 prevents migration of plasticizer to the surface being vacuum coated so that the plasticizer does not mar the appearance of the metal film. The barrier layer may also eliminate any need for treating or degassing the sheet prior to the coating step to remove the residual plasticizers, moisture or other gas forming materials which interfere with the production of a homogeneous adherent metal film.

The thickness of the hard barrier layer 2 may vary considerably but should be sufficient to be impervious to the plasticizers of the base layer 1. Such thickness may, for example, between 0.0001 and 0.001 inch or more than twenty times the thickness of the metal film 3.

The aluminum film 3 may be uncovered and exposed to the air since it has substantial resistance to corrosion. However, it is often preferable to provide a protective film of a transparent material over the film 3 even where the metal forming this film is aluminum.

Figure 3:
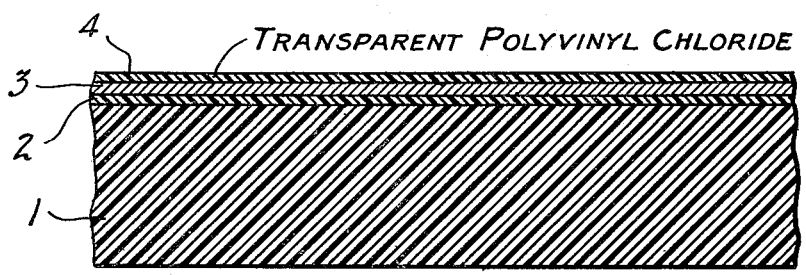
FIGURE 3 is a fragmentary vertical sectional view similar to FIG. 2 showing a modified form of plastic sheet wherein the metallized surface is covered with a transparent film of polyvinyl chloride.

FIGURE 3 of the drawing shows a sheet which is identical to the sheet of FIGURES 1 and 2 except that the aluminum film 3 is covered with a thin layer 4 of a transparent plasticized polyvinyl plastic. The preferred material for the layer 4 is a transparent plasticized polyvinyl material similar to the material used in the base layer 1 or the barrier layer 2. A suitable transparent layer 4 could be formed from a polyvinyl chloride homopolymer (or a copolymer of at least 80 percent vinyl chloride and a minor portion of a copolymerizable monoolefinic compound, such as vinyl acetate) which is plasticized with a monomeric or polymeric plasticizer or a mixture of plasticizers as above described. The top layer 4 may be applied as a plastisol with subsequent heat treatment or may be applied from solution or by calendering.

If desired a transparent adhesive may be employed to assist in bonding the layer 4 to the metal film 3. An example of such an adhesive is a composition consisting of 7 parts by weight of polymethyl methacrylate; 21 parts by weight of a copolymer of 90 percent vinyl chloride, 7 percent vinyl acetate and 3 percent maleic acid; and 70 parts by weight of methyl ethyl ketone. Such an adhesive composition may be applied to the metal film 3 and heated to form a tacky surface for receiving the plasticized polyvinyl halide of the top layer 4.

*Example I*

A plasticized polyvinyl material is prepared having the following composition:

| | Parts by weight |
|---|---|
| Polyvinyl resin | 100 |
| Dioctyl phthalate | 10 |
| Octyl decyl phthalate | 10 |
| Polyethylene glycol adipate | 20 |
| Polyethylene glycol sebacate | 20 |
| Basic lead carbonate | 3 |
| Fused lead stearate | 1 |

The polyvinyl resin constituent in the above composition may be a polyvinyl chloride homopolymer or a copolymer of 92 to 96 percent vinyl chloride and 4 to 8 percent of a copolymerizable compound, such as vinyl acetate or the like.

The material is formed into a sheet and passed between heated rolls to form a smooth plasticized polyvinyl sheet of substantially uniform thickness.

A barrier material is then prepared having the following composition:

| | Parts by weight |
|---|---|
| Polymethyl methacrylate | 30 |
| Copolymer of 85% vinyl chloride and 15% vinyl acetate | 10 |

The barrier material is dissolved with methyl ethyl ketone and applied to the plasticized polyvinyl sheet prepared above by spreading evenly with a doctor knife. The sheet is then dried to eliminate the organic solvent so that a thin hard continuous impervious barrier film of uniform thickness remains on the sheet.

The outer surface of the barrier film is then coated with aluminum particles of atomic dimensions by the conventional vacuum distillation process to form a lustrous aluminum film with a thickness of around two-millionths of an inch.

The resulting sheet is stretchable and highly flexible and has a very attractive metal finish which is not spotted or dulled by migration of plasticizers.

*Example II*

A transparent plasticized polyvinyl coating material is prepared having the following composition:

| | Parts of weight |
|---|---|
| Polyvinyl chloride (homopolymer) | 100 |
| Dioctyl phthalate | 20 |
| Polyethylene glycol adipate | 30 |
| Polypropylene glycol sebacate | 10 |
| Fused lead stearate | 1.0 |
| Tin laurate | 1.0 |

This coating material is dissolved in methyl ethyl ketone and spread on the aluminum-coated face of the sheet prepared in Example I by a doctor blade to form a thin protective film covering the sheet. The sheet is heated to evaporate the methyl ethyl ketone solvent and is found to have a hard flexible transparent protective film which does not detract from the appearance of the metal and does not interfere with flexing or stretching of the sheet.

*Example III*

A plasticized polyvinyl coating material is prepared having the following composition:

| | Parts by weight |
|---|---|
| Copolymer of 95% vinyl chloride and 5% vinyl acetate | 100 |
| Polyethylene glycol adipate | 55 |
| Dioctyl phthalate | 15 |
| Calcium carbonate | 20 |
| Pigment (TiO$_2$) | 15 |
| Barium cadmium laurate | 1.5 |
| Tin laurate | 0.5 |

A latex prime coating composition is then prepared consisting of 55 parts by weight of polyvinyl chloride (homopolymer) and 45 parts by weight of a nitrile rubber (a copolymer of 60% butadiene-1,3 and 40% acrylonitrile).

The latex prime coating composition is then applied by a printing roller to one side face of a cross woven cotton fabric sheet so as to wet the sheet and apply the latex throughout its width and length, the dry weight of the cotton sheet increasing not substantially more than about ten percent due to the pickup of the coating composition.

The plasticized polyvinyl coating material prepared above is then calendered onto the latex-impregnated side of the cotton sheet so as to form a continuous impervious layer completely covering the sheet.

A barrier layer consisting of 30 to 35 parts of polyethyl acrylate and 10 parts of a copolymer of 90% vinyl chloride and 10% vinyl acetate dissolved in methyl ethyl ketone is then applied to the plastic side of the cotton reinforced sheet as in Example I. The surface of the barrier layer, after drying, is then coated with a thin lustrous film of aluminum. The resulting sheet is highly flexible and attractive like the sheet of Examples I and II but does not stretch substantially due to the fabric reinforcement.

*Example IV*

A barrier material is prepared by dissolving equal parts of polymethyl methacrylate and polyethyl methacrylate in methyl ethyl ketone to form a solution having 18% solids. The barrier material of Example I is replaced by this solution, other conditions of Example I remaining the same, and a laminated sheet is prepared and coated with metal as in Example I. The resulting sheet is stretchable and highly flexible and has a metallized film with excellent properties.

It will be understood that the above description is by way of illustration rather than of limitation and that, in accordance with the provisions of the patent laws, variations and modifications of the specific articles disclosed herein may be made without departing from the spirit of the invention.

Having described our invention, we claim:

1. A method of making a highly flexible and stretchable article having a lustrous finish comprising the steps of forming a flexible and extensible base layer consisting predominantly of thermoplastic vinyl resins formed from vinyl chloride and containing compatible plasticizers including a monomeric plasticizer, forming a thin hard barrier film which is insoluble in and impervious to said monomeric plasticizer and which consists essentially of thermoplastic resins having depending groups attached to the carbon atoms of the main carbon chains by applying to said base layer a solution containing an organic solvent and said thermoplastic resins, at least two-thirds of the depending groups other than hydrogen and alkyl groups attached to the carbon atoms of the main carbon chains of the resins of said barrier film being highly polar acrylic ester groups which prevent bleeding of the plasticizers from the base layer to the outer surface of said barrier layer, and vacuum distilling metal particles and condensing them on the outer surface of said hard barrier film.

2. A method as defined in claim 1 wherein said acrylic ester groups are formed from alkyl methacrylates having 1 to 2 carbon atoms in the alkyl group.

3. A method as defined in claim 1 wherein said barrier layer contains a major portion of a polymer of ethyl acrylate.

4. A highly flexible and stretchable article having a lustrous finish and comprising (a) a relatively thick base layer consisting predominantly of thermoplastic vinyl resins formed from vinyl chloride and containing compatible plasticizers including a migratory monomeric plasticizer and (b) a lustrous exterior coating which does not interfere with flexing and stretching of said article, said exterior coating comprising a hard impervious barrier film which is insoluble in said monomeric plasticizer bonded to and covering said base layer and having a thickness of about 0.0001 to 0.001 inch, an adherent film of aluminum particles with a thickness of about 0.000001 to 0.000003 inch vacuum-deposited on the surface of said barrier film remote from said base layer to provide said finish, and a relatively thin flexible transparent protective film covering the aluminum film, said transparent film comprising a polymer of vinyl chloride containing a monomeric plasticizer, said barrier film consisting essentially of thermoplastic vinyl resins having depending groups attached to the carbon atoms of the main carbon chains, at least two-thirds of the depending groups other than hydrogen and alkyl groups attached to the carbon atoms of said main carbon chains being highly polar acrylic ester groups derived from alkyl methacrylates having alkyl groups with 1 to 2 carbon atoms so as to prevent bleeding of plasticizers from the base layer through the barrier film.

References Cited in the file of this patent

UNITED STATES PATENTS

| | | |
|---|---|---|
| 2,234,621 | Brous | Mar. 11, 1941 |
| 2,714,569 | Prindle et al. | Aug. 2, 1955 |
| 2,728,703 | Kiernan et al. | Dec. 27, 1955 |
| 2,742,391 | Warp | Apr. 17, 1956 |
| 2,776,225 | Fletcher | Jan. 1, 1957 |
| 2,776,598 | Dreyer | Jan. 8, 1957 |
| 2,823,156 | Hedges | Feb. 11, 1958 |
| 2,834,724 | Mendez | May 13, 1958 |
| 2,872,366 | Kiernan et al. | Feb. 3, 1959 |

OTHER REFERENCES

"German Plastics Practice," by De Bell et al.; De Bell and Richardson publishers, Springfield, Mass., 1946, pp. 200–316.

"Polyisocyanates in Bonding," article by Meyrick and Watts, published in Trans. Inst. Rubber Ind., vol. 25 (1949), pp. 150–166.